April 12, 1938.  H. C. DRAKE ET AL  2,113,785
RAIL FLAW DETECTOR MECHANISM
Filed Oct. 9, 1936   2 Sheets-Sheet 1

INVENTORS
Harcourt C. Drake &
Julian H. Bigelow
BY
ATTORNEY

April 12, 1938.   H. C. DRAKE ET AL   2,113,785
RAIL FLAW DETECTOR MECHANISM
Filed Oct. 9, 1936   2 Sheets-Sheet 2

INVENTORS
HARCOURT C. DRAKE &
JULIAN H. BIGELOW
BY
ATTORNEY

Patented Apr. 12, 1938

2,113,785

UNITED STATES PATENT OFFICE

2,113,785

RAIL FLAW DETECTOR MECHANISM

Harcourt C. Drake, Hempstead, N. Y., and Julian H. Bigelow, Millis, Mass., assignors to Sperry Products, Inc., Brooklyn, N. Y., a corporation of New York Application October 9, 1936, Serial No. 104,824

15 Claims.  (Cl. 175—183)

This invention relates to flaw detector mechanisms for electrical conductors, and more particularly to the type of mechanism employed in the Sperry rail flaw detector cars. The principle of operation employed in said mechanism is now well known and consists in sending current through the conductor under test to establish an electromagnetic field surrounding the same and then exploring said field with induction means to detect any irregularities in flux set up by the presence of flaws within the conductor. Said irregularities may be caused to induce an E. M. F. which, after being suitably amplified, may be caused to operate indicating means such as pens operating on a moving chart.

Since a rail flaw detector mechanism constructed as above would pick up every rail joint in the same manner as a flaw, due to the fact that at each rail joint there are angle bars, bolts, etc. which distort the electromagnetic field, means are provided in the Sperry car for cutting out the indicating means when the detector mechanism is passing over a rail joint.

It frequently happens that there are projecting bolts and other obstacles along the rail which also actuate the joint cut-out mechanism to cut out the indicating means while the detecting means passes thereover. Also, in certain types of railroad construction, particularly that used on certain European railways, there are provided, in addition to the rail joint angle bars, intermediate angle bars or clamps which grip the rail and fasten it to the ties at a point between the rail joints. Such intermediate clamping means would ordinarily also actuate the joint cut-out mechanism while the detecting means was passing over the intermediate clamp. It is not desirable to cut out the indicating mechanism at any points other than the rail joints for otherwise it would result in failure of the detector mechanism to test certain parts of the rail. Therefore, the principal object of our invention is the provision of means which would prevent actuation of the indicator cutout mechanism by means other than the rail joints. One such means is shown and described in Patent No. 1,973,528 to Harcourt C. Drake, granted September 11, 1934.

Further objects and advantages of this invention will become apparent in the following detailed description.

In the accompanying drawings.

Figure 1:
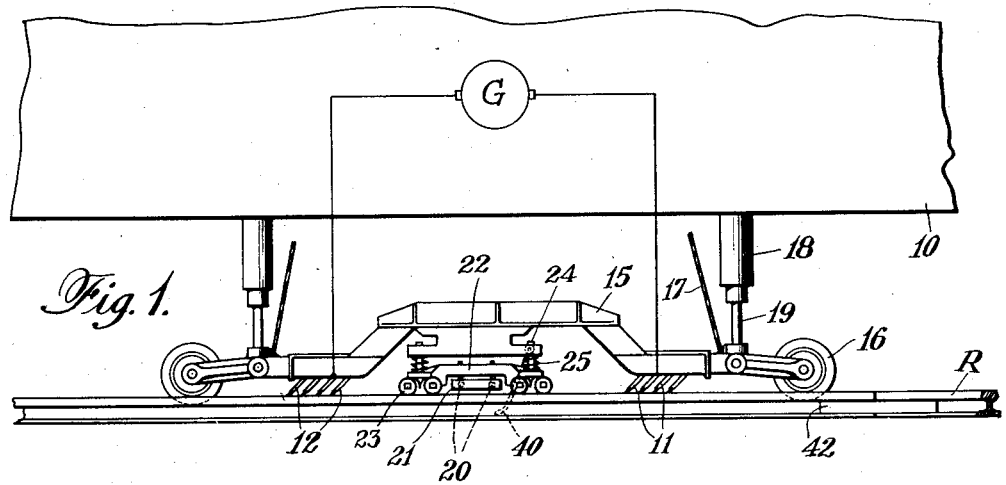
Fig. 1 is a side elevation of a Sperry rail flaw detector car to which our invention is adapted to be applied.

Referring to Fig. 1 of the drawings, we have shown a portion of the car body 10 of a Sperry rail flaw detector car within which is located a generator G designed to supply current to sets of brushes 11 and 12 supported by a current brush carriage 15 which is designed to ride upon the rail R by means such as flanged wheels 16. The current brush carriage is adapted to be held normally in raised or ineffective position by means such as cables 17 and retractile springs (not shown) and may be lowered to effective position into engagement with the rail by means such as fluid pressure supplied to cylinders 18 to depress piston-rods 19 connected to the current brush carriage. When the fluid pressure supply is cut off, the retractile springs and the cables 17 will raise the current brush carriage.

The current supplied to the rail by sets of brushes 11, 12 will establish an electromagnetic field surrounding the rail and said field will be uniform except in the region of flaw. Irregularities in the electromagnetic field surrounding the rail are designed to be detected by inductive means such as a pair of coils 20 housed in housing 21 supported on a detector carriage 22 adapted to ride upon the rails on means such as wheels 23, said detector carriage being in turn supported on the current brush carriage for movement independent thereof by means of a limited universal connection comprising loose-fitting bolts 24 and springs 25. Variations in the current supply will have no effect upon the induction coils 20 because the coils are of equal inductance and oppositely connected. The coils normally cut a constant number of lines of force; but on entering a region of flaw, one of said coils will cut a different number of lines of force to generate a differential E. M. F. which, after being suitably amplified by amplifier A, may be caused to operate any suitable indicator such as pens P and P' operating on a moving chart.

The output of amplifier A operates pens P and P' by means such as relays 30, 31 which are of different strengths so that a weak flaw will cause only relay 30 to attract its armature 30' and close contacts 32 through pen relay 34, while a strong output of amplifier A due to a substantial region of flaw will cause both output relays 30 and 31 to attract their armatures 30' and 31' to close contacts 32 and 33 and actuate two pen relays 34 and 35 to actuate pens P and P'. Said pens normally trace a straight line on a moving chart but when actuated by the relays 34 and 35 they will make a jog in the line to indicate the presence of a flaw.

Figure 2:
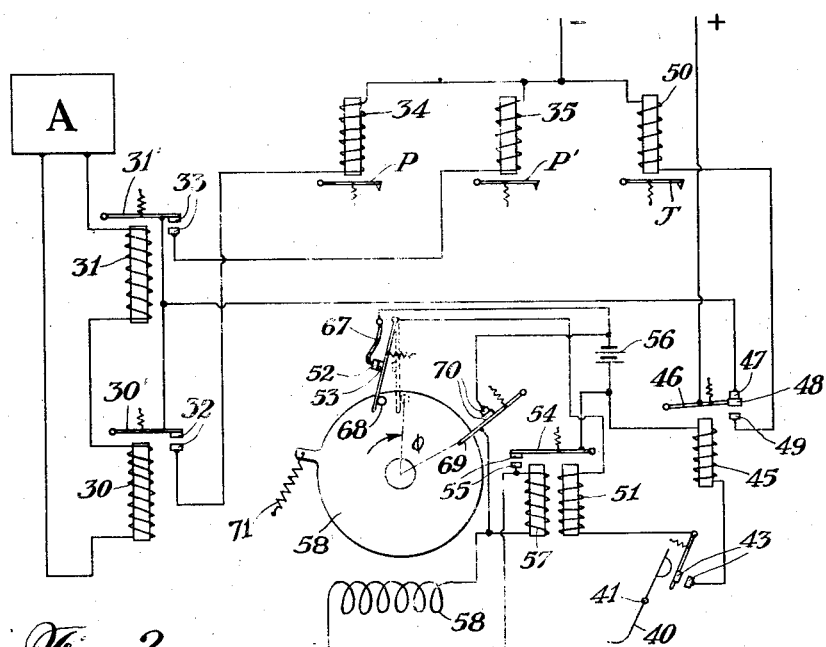
Fig. 2 is a wiring diagram illustrating one form of our invention.

It will be seen that when passing over a rail joint, the detector mechanism would pick up said rail joint and the result would be that pens P and P' would give a series of indications at each rail joint. This is undesirable since it tends to complicate the record and makes it difficult to detect an indication of flaw close to the rail joint. For this reason, means are provided for cutting out the operation of pens P and P' when the detector mechanism is passing over a rail joint. Said means comprises finger 40 in advance of the detector mechanism 20, said finger being designed to engage the side of the rail so that it will contact with the angle-bar 42 at the rail joint. Said finger is pivoted at 41, as shown in Fig. 2, so that upon engagement with the angle-bar at a rail joint it will close contacts 43, which will close a circuit extending through a joint cut-out relay 45 which will attract its armature 46 to break contacts 47, 48 which are in the line between contacts 32, 33 and the pen magnets 34, 35. At the same time that armature 46 is attracted to break contacts 47, 48, contacts 48, 49 will be made to energize a joint pen magnet 50 to operate a joint pen J which will indicate on the chart that a joint has been encountered.

As stated in the introduction, certain projections in the line of movement of the joint finger, such as upstanding bolts or, as in the case of certain European types of railroad construction, intermediate clamps, would tend to operate the joint finger in the same manner as the angle bar, and there would thus be an interval of time during which the flaw indicating mechanism would be rendered inoperative so that if a flaw happened to be passed over during said interval it would be missed. To obviate this difficulty, we provide the following means which has for its object to prevent the joint cut-out mechanism from rendering the pens P and P' ineffective for a predetermined interval after the joint finger has engaged a rail joint, said interval being sufficient to enable the joint cut-out finger to reach a point slightly in advance of the next rail joint. Thus, during the entire interval between the time that the joint finger engages one rail joint and the time that said joint finger approaches the next rail joint, it will be impossible for any intermediate obstructions to actuate the mechanism which cuts out the indicating pens, so that even if an upstanding bolt or an intermediate clamp is engaged by the joint finger to close contacts 43, it will not result in opening contacts 47 and 48 to render the pens P and P' ineffective.

Figure 4:
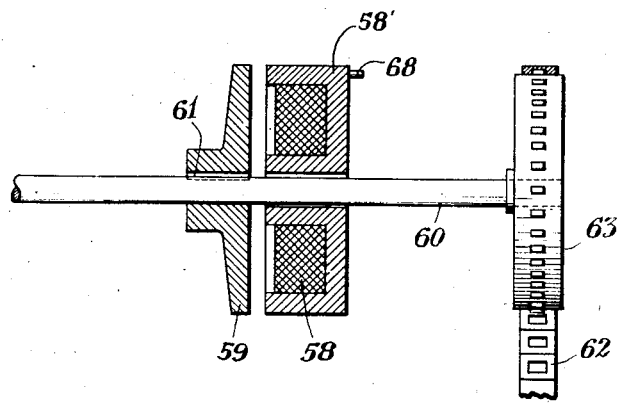
Fig. 4 is a detail of a clutch mechanism employed in the Figs. 2 and 3 forms of the invention.

To accomplish the above purpose we have disclosed two forms of our invention. The first form is shown in Fig. 2. In this form of invention the closing of contacts 43 by actuation of the joint finger when said finger engages the rail joint serves to close a circuit through a magnet 51 and a pair of contacts 52, 53. Energization of magnet 51 serves to attract armature 54 to close a set of contacts 55 and thus close an independent circuit extending from battery 56 through magnet 57 and field coil 58 of a clutch. Magnet 57 also attracts armature 54 whereby it will be seen that even though magnet 51 is de-energized by reason of the fact that finger 40 has passed beyond the angle bar and opened contacts 43, the armature 54 will nevertheless remain attracted by magnet 57 to keep contacts 55 closed and field coil 58 energized. The energization of field coil 58 serves to attract its armature 59 (see Fig. 4) which is slidably mounted on shaft 60 by key 61, the said shaft 60 being driven from the wheels of the car body through any suitable connection as by chain 62 and sprocket wheel 63 so that said shaft 60 will be driven in definite relationship to the movement of the car. A contact 53 under the tension of spring 67 is pressed into engagement with a contact 52 normally held against movement by a projection 68 on coil member 58'. As the coil member 58' attracts its armature 59 and is driven by the shaft 60 in the direction of the arrow, the tension on spring 67 relaxes and after a certain degree of movement equivalent to the passage of the joint finger beyond the angle bar, the contacts 52, 53 open. Said contacts remain open throughout the time that member 58' is travelling through the arc indicated by the letter $\phi$ when projection 68 carried by said member 58 engages a spring finger 69 in its path to break contacts 70 in the circuit through coil 57. It will now be seen that since contacts 52, 53 in the circuit through coil 45 have been broken, thereafter throughout the remainder of the angular movement $\phi$ the circuit through coil 45 remains broken and no matter how many times the joint finger 40 may be actuated by any obstruction or intermediate clamp which it may engage, it will not be able to energize coil 45 to render the pens P and P' ineffective. It is only after contacts 70 have been opened and magnet 57 de-energized to release contacts 55 and de-energize field coil 58 to permit spring 71 to restore the coil member 58' to its original position, wherein contacts 52 and 53 engage again, that closure of contacts 43 by operation of finger 40 will again be effective to energize coil 45 to render the pens P and P' effective. The angular distance $\phi$ is predetermined so that the contacts 52, 53 will be reestablished again just before the finger 40 reaches a position in engagement with the angle bar of the succeeding joint.

Figure 3:
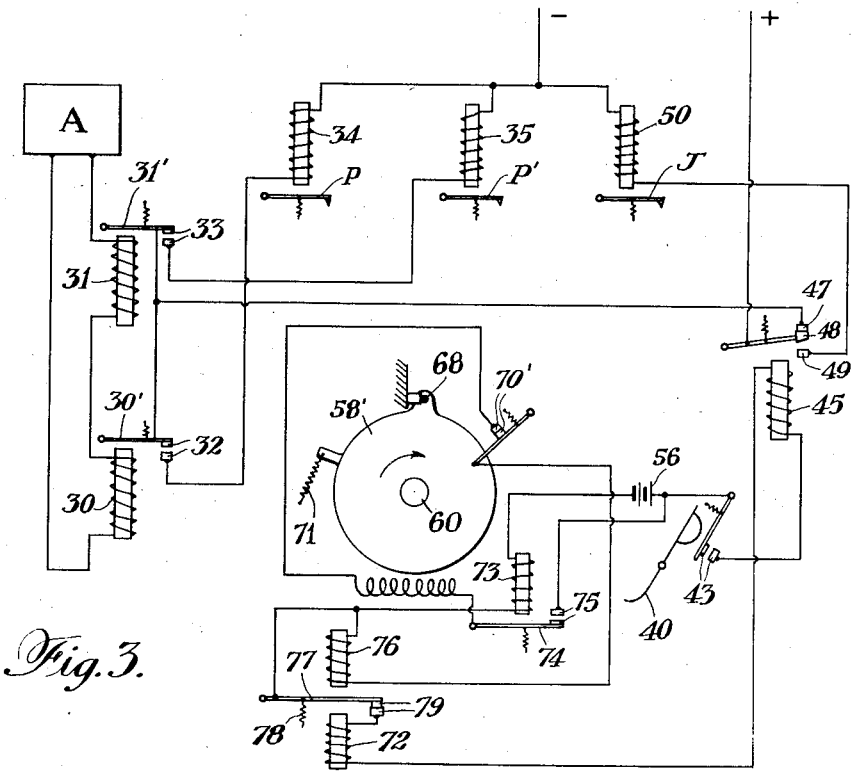
Fig. 3 is a second wiring diagram illustrating another form of our invention.

In a modified form of our invention, shown in Fig. 3, we utilize the same principle of rotating a clutch through a given angular distance to determine the interval during which the joint finger is incapable of rendering the pens P and P' ineffective, but a more definite starting point for this interval is rendered possible. Thus, while in the Fig. 2 form the tension within the spring finger 67 was relied upon to determine the time when the contacts 52 and 53 open, and this was predetermined to allow sufficient time for finger 40 to pass beyond the angle bar and thus begin the interval when the circuit controlled by the joint finger is ineffective, in the form shown in Fig. 3 we show a mechanism which is capable of beginning at a more definite point the interval when the circuit controlled by finger 40 is rendered ineffective. For this purpose, the closing of contacts 43 by the joint finger 40 energizes a circuit including a coil 72 and a coil 73. Energization of coil 73 serves to attract an armature 74 to close a pair of normally open contacts 75 and thus close the circuit through the field coil 58 of the clutch member 58' and through a magnet 76. Energization of the field coil 58 causes it to attract armature 59 and sets in motion the coil member. The rotation of coil member 58 in this instance does not serve to open the circuit controlled by joint finger 40, said circuit remaining closed until joint finger 40 has passed beyond the angle bar. At the moment that joint finger 40 leaves the angle bar to open contacts 43, magnet 72 is de-energized to permit magnet 76 to attract armature 77 which heretofore had been held open by magnet 72 and spring 78. Attraction of armature 77 by magnet 76 opens contacts 79 and these contacts 79 in the circuit controlled by joint finger 40 remain open until such time as the circuit through magnet 76 is broken to permit spring 78 to bring armature 77 back to original position to close contacts 79. In other words, as long as magnet 76 is energized it is impossible for joint finger 40, even though it is operated by some obstruction, to close contacts 43 to energize magnet 45 and render the pens P and P' ineffective. Magnet 76 remains energized until the clutch member 58' has rotated through the angle Φ to permit projection 68 to open a set of contacts 70' as in the Fig. 2 form. When contacts 70' are opened, magnet 76 is de-energized, permitting spring 78 to move armature 77 back to normal position to close contacts 79 and thus render the circuit through magnet 45 again effective so that actuation of finger 40 can energize the same to render the pens P and P' ineffective. As before, the angle Φ is so set that the circuit through magnet 45 is broken until the joint finger 40 is about to engage the angle bar of the succeeding joint.

In accordance with the provisions of the patent statutes, we have herein described the principle and operation of our invention, together with the apparatus which we now consider to represent the best embodiment thereof, but we desire to have it understood that the apparatus shown is only illustrative and that the invention can be carried out by other equivalent means. Also, while it is designed to use the various features and elements in the combination and relations described, some of these may be altered and others omitted without interfering with the more general results outlined, and the invention extends to such use.

Having described our invention, what we claim and desire to secure by Letters Patent is:

1. In a flaw detector car adapted to travel along the rails, the adjacent rails being joined together said car having means responsive to flaws, indicating means, means whereby said responsive means actuates said indicating means, means adapted to cooperate with the rail joint for rendering said actuating means ineffective when said responsive means passes over a rail joint, and means for preventing said cooperating means from again rendering said actuating means ineffective for a predetermined interval after said cooperating means has passed out of cooperative relation with the rail joint, said last-named means including a movable member, and means whereby said member is driven in predetermined ratio to the movement of the car.

2. In a flaw detector car adapted to travel along the rails, the adjacent rails being joined together, said car having means responsive to flaws, indicating means, means whereby said responsive means actuates said indicating means, means adapted to cooperate with the rail joint for rendering said actuating means ineffective when said responsive means passes over a rail joint, and means for preventing said cooperating means from again rendering said actuating means ineffective for a predetermined interval after said cooperating means has passed out of cooperative relation with the rail joint, said last-named means including a movable member, means whereby said member is driven in predetermined ratio to the movement of the car, said member being normally inoperative for the purpose of rendering said actuating means ineffective, and means whereby said member is rendered operative for said purpose when said cooperative means is in predetermined relationship to the rail joint.

3. In a flaw detector car adapted to travel along the rails, the adjacent rails being joined together, said car having means responsive to flaws, indicating means, means whereby said responsive means actuates said indicating means, means adapted to cooperate with the rail joint for rendering said actuating means ineffective when said responsive means passes over a rail joint, and means for preventing said cooperating means from again rendering said actuating means ineffective for a predetermined interval after said cooperating means has passed out of cooperative relation with the rail joint, said last-named means including a movable member, means whereby said member is driven in predetermined ratio to the movement of the car, said member being normally inoperative for the purpose of rendering said actuating means ineffective, means whereby said member is rendered operative for said purpose when said cooperative means is in predetermined relationship to the rail joint, and means whereby said member is again rendered inoperative for said purpose after a predetermined degree of movement of said member.

4. In a flaw detector car adapted to travel along the rails, the adjacent rails being joined together, said car having means responsive to flaws, indicating means, means whereby said responsive means actuates said indicating means, means adapted to cooperate with the rail joint for rendering said actuating means ineffective when said responsive means passes over a rail joint, and means for preventing said cooperating means from again rendering said actuating means ineffective for a predetermined interval after said cooperating means has passed out of cooperative relation with the rail joint, said last-named means including a movable member, means whereby said member is driven in predetermined ratio to the movement of the car, said member being normally inoperative for the purpose of rendering said actuating means ineffective, and means whereby said member is rendered operative for said purpose a predetermined interval after said cooperating means first comes into cooperative relation with the rail joint.

5. In a flaw detector car adapted to travel along the rails, the adjacent rails being joined together, said car having means responsive to flaws, indicating means, means whereby said responsive means actuates said indicating means, means adapted to cooperate with the rail joint for rendering said actuating means ineffective when said responsive means passes over a rail joint, and means for preventing said cooperating means from again rendering said actuating means ineffective for a predetermined interval after said cooperating means has passed out of cooperative relation with the rail joint, said last-named means including a movable member, means whereby said member is driven in predetermined ratio to the movement of the car, said member being normally inoperative for the purpose of rendering said actuating means ineffective, and means whereby said member is rendered operative for said purpose when said member has moved a predetermined degree after said cooperating means first comes into cooperative relation with the rail joint.

6. In a flaw detector car adapted to travel along the rails, the adjacent rails being joined together, said car having means responsive to flaws, indicating means, means whereby said responsive means actuates said indicating means, means adapted to cooperate with the rail joint for rendering said actuating means ineffective when said responsive means passes over a rail joint, and means for preventing said cooperating means from again rendering said actuating means ineffective for a predetermined interval after said cooperating means has passed out of cooperative relation with the rail joint, said last-named means including a movable member, means whereby said member is driven in predetermined ratio to the movement of the car, said member being normally inoperative for the purpose of rendering said actuating means ineffective, and means whereby said member is rendered operative for said purpose when said cooperative means passes out of cooperative relation with the rail joint.

7. In a flaw detector car adapted to travel along the rails, the adjacent rails being joined together, said car having means responsive to flaws, indicating means, means whereby said responsive means actuates said indicating means, means adapted to cooperate with the rail joint for rendering said actuating means ineffective when said responsive means passes over a rail joint, and means for preventing said cooperating means from again rendering said actuating means ineffective for a predetermined interval after said cooperating means has passed out of cooperative relation with the rail joint, said last-named means including a movable member, means whereby said member is driven in predetermined ratio to the movement of the car, said member being normally inoperative for the purpose of rendering said actuating means ineffective, means whereby said member is rendered operative for said purpose a predetermined interval after said cooperating means first comes into cooperative relation with the rail joint, and means whereby said member is again rendered inoperative for said purpose after a predetermined degree of movement of said member.

8. In a flaw detector car adapted to travel along the rails, the adjacent rails being joined together, said car having means responsive to flaws, indicating means, means whereby said responsive means actuates said indicating means, means adapted to cooperate with the rail joint for rendering said actuating means ineffective when said responsive means passes over a rail joint, and means for preventing said cooperating means from again rendering said actuating means ineffective for a predetermined interval after said cooperating means has passed out of cooperative relation with the rail joint, said last-named means including a movable member, means whereby said member is driven in predetermined ratio to the movement of the car, said member being normally inoperative for the purpose of rendering said actuating means ineffective, means whereby said member is rendered operative for said purpose when said member has moved a predetermined degree after said cooperating means first comes into cooperative relation with the rail joint, and means whereby said member is again rendered inoperative for said purpose after a predetermined degree of movement of said member.

9. In a flaw detector car adapted to travel along the rails, the adjacent rails being joined together, said car having means responsive to flaws, indicating means, means whereby said responsive means actuates said indicating means, means adapted to cooperate with the rail joint for rendering said actuating means ineffective when said responsive means passes over a rail joint, and means for preventing said cooperating means from again rendering said actuating means ineffective for a predetermined interval after said cooperating means has passed out of cooperative relation with the rail joint, said last-named means including a movable member, means whereby said member is driven in predetermined ratio to the movement of the car, said member being normally inoperative for the purpose of rendering said actuating means ineffective, means whereby said member is rendered operative for said purpose when said cooperative means passes out of cooperative relation with the rail joint, and means whereby said member is again rendered inoperative for said purpose after a predetermined degree of movement of said member.

10. In a flaw detector car adapted to travel along the rails, the adjacent rails being joined together, said car having means responsive to flaws, indicating means, means whereby said responsive means actuates said indicating means, means adapted to cooperate with the rail joint for rendering said actuating means ineffective when said responsive means passes over a rail joint, and means for preventing said cooperating means from again rendering said actuating means ineffective for a predetermined interval after said cooperating means has passed out of cooperative relation with the rail joint, said last-named means including a normally moving member, a normally stationary member, means whereby said first member is driven in predetermined ratio to the movement of the car, means normally ineffective for clutching said second member to said first member to cause said members to move together, means whereby said clutching means is rendered effective when said cooperating means is in predetermined relationship to the rail joint, and means whereby movement of said second member renders said actuating means ineffective.

11. In a flaw detector car adapted to travel along the rails, the adjacent rails being joined together, said car having means responsive to flaws, indicating means, means whereby said responsive means actuates said indicating means, means adapted to cooperate with the rail joint for rendering said actuating means ineffective when said responsive means passes over a rail joint, and means for preventing said cooperating means from again rendering said actuating means ineffective for a predetermined interval after said cooperating means has passed out of cooperative relation with the rail joint, said last-named means including a normally moving member, a normally stationary member, means whereby said first member is driven in predetermined ratio to the movement of the car, means normally ineffective for clutching said second member to said first member to cause said members to move together, means whereby said clutching means is rendered effective when said cooperating means is in predetermined relationship to the rail joint, and means whereby movement of said second member renders said actuating means ineffective after a predetermined degree of movement of said second member.

12. In a flaw detector car adapted to travel along the rails, the adjacent rails being joined together, said car having means responsive to flaws, indicating means, means whereby said responsive means actuates said indicating means, means adapted to cooperate with the rail joint for rendering said actuating means ineffective when said responsive means passes over a rail joint, and means for preventing said cooperating means from again rendering said actuating means ineffective for a predetermined interval after said cooperating means has passed out of cooperative relation with the rail joint, said last-named means including a normally moving member, a normally stationary member, means whereby said first member is driven in predetermined ratio to the movement of the car, means normally ineffective for clutching said second member to said first member to cause said members to move together, means whereby said clutching means is rendered effective when said cooperating means is in predetermined relationship to the rail joint, and means whereby movement of said second member renders said actuating means ineffective when said cooperating means passes out of cooperative relation with the rail joint.

13. In a flaw detector car adapted to travel along the rails, the adjacent rails being joined together, said car having means responsive to flaws, indicating means, means whereby said responsive means actuates said indicating means, means adapted to cooperate with the rail joint for rendering said actuating means ineffective when said responsive means passes over a rail joint, and means for preventing said cooperating means from again rendering said actuating means ineffective for a predetermined interval after said cooperating means has passed out of cooperative relation with the rail joint, said last-named means including a normally moving member, a normally stationary member, means whereby said first member is driven in predetermined ratio to the movement of the car, means normally ineffective for clutching said second member to said first member to cause said members to move together, means whereby said clutching means is rendered effective when said cooperating means is in predetermined relationship to the rail joint, means whereby movement of said second member renders said actuating means ineffective, and means whereby said clutching means is rendered ineffective after a predetermined degree of movement of said second means.

14. In a flaw detector car adapted to travel along the rails, the adjacent rails being joined together, said car having means responsive to flaws, indicating means, means whereby said responsive means actuates said indicating means, means adapted to cooperate with the rail joint for rendering said actuating means ineffective when said responsive means passes over a rail joint, and means for preventing said cooperating means from again rendering said actuating means ineffective for a predetermined interval after said cooperating means has passed out of cooperative relation with the rail joint, said last-named means including a normally moving member, a normally stationary member, means whereby said first member is driven in predetermined ratio to the movement of the car, means normally ineffective for clutching said second member to said first member to cause said members to move together, means whereby said clutching means is rendered effective when said cooperating means is in predetermined relationship to the rail joint, means whereby movement of said second member renders said actuating means ineffective after a predetermined degree of movement of said second member, and means whereby said clutching means is rendered ineffective after a predetermined degree of movement of said second means.

15. In a flaw detector car adapted to travel along the rails, the adjacent rails being joined together, said car having means responsive to flaws, indicating means, means whereby said responsive means actuates said indicating means, means adapted to cooperate with the rail joint for rendering said actuating means ineffective when said responsive means passes over a rail joint, and means for preventing said cooperating means from again rendering said actuating means ineffective for a predetermined interval after said cooperating means has passed out of cooperative relation with the rail joint, said last-named means including a normally moving member, a normally stationary member, means whereby said first member is driven in predetermined ratio to the movement of the car, means normally ineffective for clutching, said second member to said first member to cause said members to move together, means whereby said clutching means is rendered effective when said cooperating means is in predetermined relationship to the rail joint, means whereby movement of said second member renders said actuating means ineffective when said cooperating means passes out of cooperative relation with the rail joint, and means whereby said clutching means is rendered ineffective after a predetermined degree of movement of said second means.

HARCOURT C. DRAKE.
JULIAN H. BIGELOW.